(12) United States Patent
Wick et al.

(10) Patent No.: US 10,634,214 B2
(45) Date of Patent: Apr. 28, 2020

(54) SECURING AND CENTERING DEVICE AND VIBRATION DAMPING DEVICE INCLUDING SAME

(71) Applicant: VIBRACOUSTIC GMBH, Darmstadt (DE)

(72) Inventors: Alexander Wick, Heitersheim (DE); Ernst Koch, Bad Bellingen (DE); Martin Glass, Rheinfelden (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 16/294,253

(22) Filed: Mar. 6, 2019

(65) Prior Publication Data
US 2019/0277367 A1    Sep. 12, 2019

(30) Foreign Application Priority Data

Mar. 7, 2018    (DE) .................. 10 2018 105 262

(51) Int. Cl.
*F16F 15/12*     (2006.01)
*F16F 15/131*    (2006.01)
*F16F 15/133*    (2006.01)

(52) U.S. Cl.
CPC ...... *F16F 15/13185* (2013.01); *F16F 15/133* (2013.01)

(58) Field of Classification Search
CPC ........... F16F 15/13142; F16F 15/13164; F16F 15/13185; F16F 15/133; F16F 15/1332; F16F 15/30; F16F 15/315; F16F 15/3153; F16F 15/34; F16B 41/002; F16D 3/78; F16D 3/79; F16D 13/58
See application file for complete search history.

(56) References Cited

U.S. PATENT DOCUMENTS 5,465,635 A * 11/1995 Kono .................... F16D 13/70
                                                464/68.1
8,503,908 B2 * 8/2013 Kuroda ................ G03G 15/757
                                                399/117

FOREIGN PATENT DOCUMENTS

| DE | 4317332 A1 | 12/1993 |
|----|------------|---------|
| DE | 69406644 T2 | 3/1998 |
| DE | 19727680 A1 | 1/1999 |
| DE | 10158943 A1 | 6/2002 |

(Continued)

OTHER PUBLICATIONS

Machine translation of FR 2958704 A1 obtained on Jul. 24, 2019.*

*Primary Examiner* — Adam D Rogers
(74) *Attorney, Agent, or Firm* — Fishman Stewart PLLC

(57) ABSTRACT

A securing and centring device for securing fastening elements of a vibration damping device and for centring said vibration damping device on a component, such as a crankshaft. The securing and centring device may includes a securing mechanism that can be inserted into an opening of the vibration damping device and is configured to secure a fastening element inserted into the opening against falling out, a centering mechanism insertable into a further opening of the vibration damping device and into an assembly opening of said component for positioning and/or centering the vibration damping device and said component relative to each other, and a connecting member connecting the securing mechanism and the centering mechanism. A vibration damping device may include such a securing and centering device.

15 Claims, 6 Drawing Sheets

(56) References Cited

FOREIGN PATENT DOCUMENTS

| DE | 102012219065 A1 | | 5/2013 | |
|----|----|----|----|----|
| FR | 2796434 A1 | * | 1/2001 | ............. F16D 13/58 |
| FR | 2852650 A1 | * | 9/2004 | ........ F16F 15/13142 |
| FR | 2958704 A1 | | 10/2011 | |
| FR | 3039240 A1 | * | 1/2017 | ........ F16F 15/13142 |
| GB | 2084292 A | * | 4/1982 | ............... F16D 3/78 |
| GB | 2328000 A | | 2/1999 | |
| WO | WO-9508724 A1 | * | 3/1995 | ............ F16B 41/002 |
| WO | 2011124805 A1 | | 10/2011 | |
| WO | WO-2017198792 A1 | * | 11/2017 | .......... F16F 15/1203 |

\* cited by examiner

SECURING AND CENTERING DEVICE AND VIBRATION DAMPING DEVICE INCLUDING SAME

CROSS-REFERENCE TO RELATED APPLICATIONS

This application claims priority to German Patent Application No. 10 2018 105 262.6, filed Mar. 7, 2018, the contents of which are hereby incorporated by reference in its entirety.

TECHNICAL FIELD

The present invention relates to a securing and centring means for securing the fastening elements of a vibration damping device and for centring the vibration damping device on a crankshaft. The invention also relates to a vibration damping device with such a securing and centring means.

BACKGROUND

Vibration damping devices of the type mentioned above are used to damp and/or isolate the vibrations occurring on the crankshaft. The vibration damping device is attached to a crankshaft of a combustion engine by means of screws. For this purpose, the vibration damping device has openings into which the screws are inserted and bolted with threaded holes in the crankshaft.

The vibration damping device is usually supplied with the screws, the screws already being inserted in the screw holes of the vibration damping device in order to simplify assembly. In order to prevent the screws from falling out, it is known to use an anti-loss device.

DE 10 2012 219 065 A1 discloses an anti-loss device for a fastening device of a flywheel, which has a circumferential section with a recess, the circumferential section being configured for such arrangement at and/or in a assembly opening that the recess is at the assembly opening and that the outer circumferential section has several tongues which extend radially inwards from the outer circumferential section into the disc-shaped recess and abut against the screws in a friction-locked manner. The tongues are made of an elastic material.

Furthermore, DE 694 06 644 T2 discloses an anti-loss device for fastening screws of a coupling module, which is formed from an annular element which has a plurality of sleeve-shaped receptacles into each of which a head of a fastening screw can be inserted in a force-locking manner.

SUMMARY

The present invention is based on the task of creating a securing and centring means as well as a vibration damping device that simplify the assembly process and reduce assembly costs.

Embodiments of a securing and centring means and/or a vibration damping device may be configured to address this task.

Advantageous embodiments of securing and centring means are also disclosed.

The invention relates to a securing and centring means for securing fastening elements of a vibration damping device and for centring the vibration damping device on a component, in particular on an crankshaft, including at least one securing mechanism which is insertable into an opening of the vibration damping device and configured for the axial securing of a fastening element inserted into the opening against falling out, at least one centring mechanism, which is insertable into a further opening of the vibration damping device and into an assembly opening of the crankshaft in order to position and/or to centre the two parts in relation to each other, and a connecting member connecting the receiving mechanism and the centring mechanism.

By connecting at least one securing mechanism and at least one centring mechanism to form one component, it is possible to secure the screws against falling out during delivery and assembly and, at the same time, to position and to centre the vibration damping device and the crankshaft relative to each other. This simplifies the assembly process, and assembly costs are reduced. In addition, by connecting the individual elements, namely the securing mechanism and the centring mechanism, by means of the connecting member, an exact position of the elements with respect to one another is determined, so that they cannot be caught in the screw assembly. Furthermore, individual elements, such as a securing mechanism or a centring mechanism, are prevented from being forgotten. Thus, the process reliability of the assembly process is clearly enhanced. In addition, the centring mechanism is designed in such a way that a centring in different planes and a centring on the crankshaft are facilitated. The fastening elements are advantageously designed as screws.

Preferably, the securing and centring means has at least one centring device and at least two securing devices. In addition, the securing and centring means may have from two securing mechanisms to n securing mechanisms. If the securing and centring means has several securing mechanisms, the securing mechanisms and the centring mechanism may be positioned at equidistant intervals or at different distances from each other.

In an advantageous embodiment, the centring mechanism is designed as a centring bushing. The centring bushing facilitates precise centring and positioning of the vibration damping device on a crankshaft. For this purpose, a section of the centring bushing may project or protrude from one end face of the vibration damping device. In particular, the section of the centring bushing projects from the opening of the vibration damping device. The projecting section may be inserted during the assembly of the vibration damper on the crankshaft into a bore or an assembly opening of the crankshaft. This facilitates an exact positioning and centring of the vibration damping device on the crankshaft. The centring bushing may also be described as a fitting bushing or positioning bushing. Advantageously, the centring bushing is designed as a sleeve. The centring bushing may have protrusions on its outer peripheral side which form a cylindrical surface. In addition, the centring bushing may have chamfers which, viewed in axial direction, are inclined.

In an advantageous embodiment, the centring mechanism is provided with a securing mechanism. In this way, the screw inserted in the centring mechanism can be secured against falling out. Advantageously, the centring mechanism and the securing mechanism are arranged adjacent to each other when viewed in axial direction. Further advantageously, the centring mechanism and the securing mechanism are designed integrally.

In an advantageous embodiment, the centring mechanism has a predetermined bending point which can be deformed by applying a force to the centring mechanism. Advantageously, the deformation is formed by a radially outward bulging. The bulging formed by the deformation is disposed on an inner circumferential surface of the assembly opening of the crankshaft and thus facilitates a radial positioning of the vibration damping device relative to the crankshaft free of play. The force which causes a deformation of the centring mechanism, is generated in particular during the bolting of the vibration damping device to the crankshaft. In particular, the force that is required to deform the predetermined bending point is a force directed in the axial direction, i.e. a force directed perpendicular to the radial direction.

In an advantageous embodiment, the predetermined bending point is designed as a tapered wall section in the centring device. Further advantageously, the tapered wall section is designed as a circular recess introduced into the inner circumferential surface of the centring bushing. The predetermined bending point can thus be generated easily and economically during the production of the centring bushing, by introducing a recess in the inner surface of the centring bushing. In an advantageous embodiment, the cross-section of the tapered section of the wall may be of trapezoid shape.

In an advantageous embodiment, the at least one securing mechanism is designed as a sleeve. A sleeve allows easy insertion of the safety mechanism into the opening of the vibration damping device and easy insertion of a fastening element, such as a screw, for instance, into the safety mechanism. Advantageously, the sleeve is designed to be elastically deformable. This allows the sleeve to deform when a screw is inserted and to engage the screw in a keyed and/or friction-locked manner and secure it from falling out.

In an advantageous embodiment, the sleeve has radially inwardly projecting protrusions, which abut against the fastening element in a keyed and/or friction-locked manner. The screw is fixed in the sleeve by means of the protrusions. In an advantageous embodiment, the protrusions form a wave-shaped contour in cross-section.

In an advantageous embodiment, the protrusions are deformed during insertion of a fastening element. By way of the elasticity of the protrusions, a keyed and/or friction-locked connection between the sleeve and the fastening element can be generated. The protrusions exert pressure on the fastening element and thus retain it in the sleeve. As a result, the fastening element is secured against falling out from the sleeve. In particular the protrusions are radially pressed outside when a fastening element is inserted.

In an advantageous embodiment the connecting member is designed as an outer ring and/or as an inner ring and/or as struts. If the fastening element is designed as an outer ring, the outer ring surrounds the securing mechanism and the centring mechanism, so that the securing mechanism and the centring mechanism are arranged inside the outer ring. In particular, the securing mechanism and the centring mechanism may be connected with an inner peripheral section of the outer ring. If the fastening element is designed as an inner ring, the securing mechanism and the centring mechanism surround the inner ring. Thus, the securing mechanism and the centring mechanism may be connected to an outer circumferential section of the inner ring. If more than one securing mechanism is provided, the securing mechanisms and the centring mechanism surround the inner ring at equidistant intervals. If the fastening element is designed as struts, then the struts connect the securing mechanism and the centring mechanism. Advantageously, the struts are connected with each other and with the securing mechanism and the centring mechanism. Advantageously, the outer ring and/or the inner ring and/or the struts can be inserted into a receiving groove inserted into the attached component. The receiving groove can be introduced in a hub of the vibration damping device or in a thrust piece.

In an advantageous embodiment, the outer ring and/or the inner ring is designed as a circular ring or a polygonal ring. Preferably, the ring is inserted into a receiving groove introduced into the vibration damper. Advantageously, the outer ring surrounds the at least one securing mechanism and the centring mechanism. For this purpose, the securing mechanism and the centring mechanism are connected to an inner circumferential surface of the outer ring. In addition, the securing mechanism and the centring mechanism may surround the inner ring. For this purpose, the securing mechanism and the centring mechanism may be connected to an outer circumferential surface of the inner ring.

In an advantageous embodiment, the securing and centring means is designed integrally. Due to the one-piece design, the securing and centring means can be produced in a simple and cost-effective manner, for example in a casting process, in particular in an injection moulding process. In addition, the one-piece design ensures that none of the elements, i.e. a securing mechanism or a centring mechanism, is forgotten during assembly, so that process reliability is enhanced. As a result, the connecting member designed as an outer ring, an inner ring and/or as struts is substance-bonded with the securing mechanism and the centring mechanism.

In an advantageous embodiment, the securing and centring means is made of metal or plastic. A securing and centring means made of plastic can be produced in a simple and cost-effective manner in an injection moulding process. Advantageously, a securing and centring means made of plastic is made of polybutylene terephthalate (PBT). A securing and centring means made of plastic has a low weight. A securing and centring means made of metal is advantageously made of aluminium. Furthermore, the securing and centring means may be designed as a hybrid component, e.g. the centring mechanism is made of metal and the securing mechanism and the connecting mechanism are made of plastic.

In addition, the invention refers to a vibration damping device for reducing vibrations on a crankshaft, having fastening elements for fastening the vibration damping device to the crankshaft and a securing and centring means according to the invention.

BRIEF DESCRIPTION OF THE DRAWINGS

In the following, a securing and centring means, a vibration damping device and other features and advantages are explained in more detail by means of preferred embodiments, which are shown schematically in the figures. Shown are.

DETAILED DESCRIPTION

Figure 1:
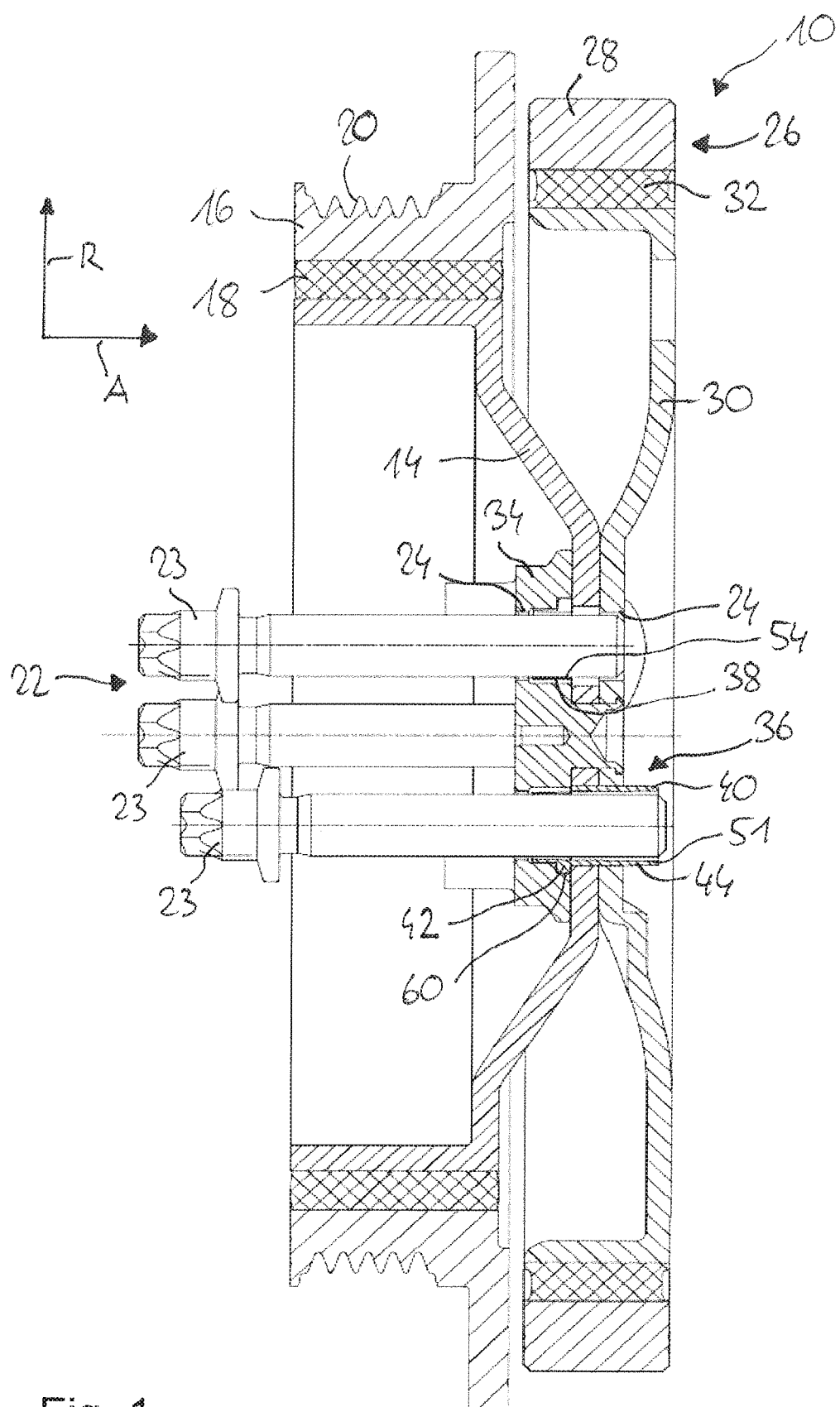
FIG. 1 a cross-section of a vibration damping device having a securing and centring means according to a first embodiment.
Figure 4:
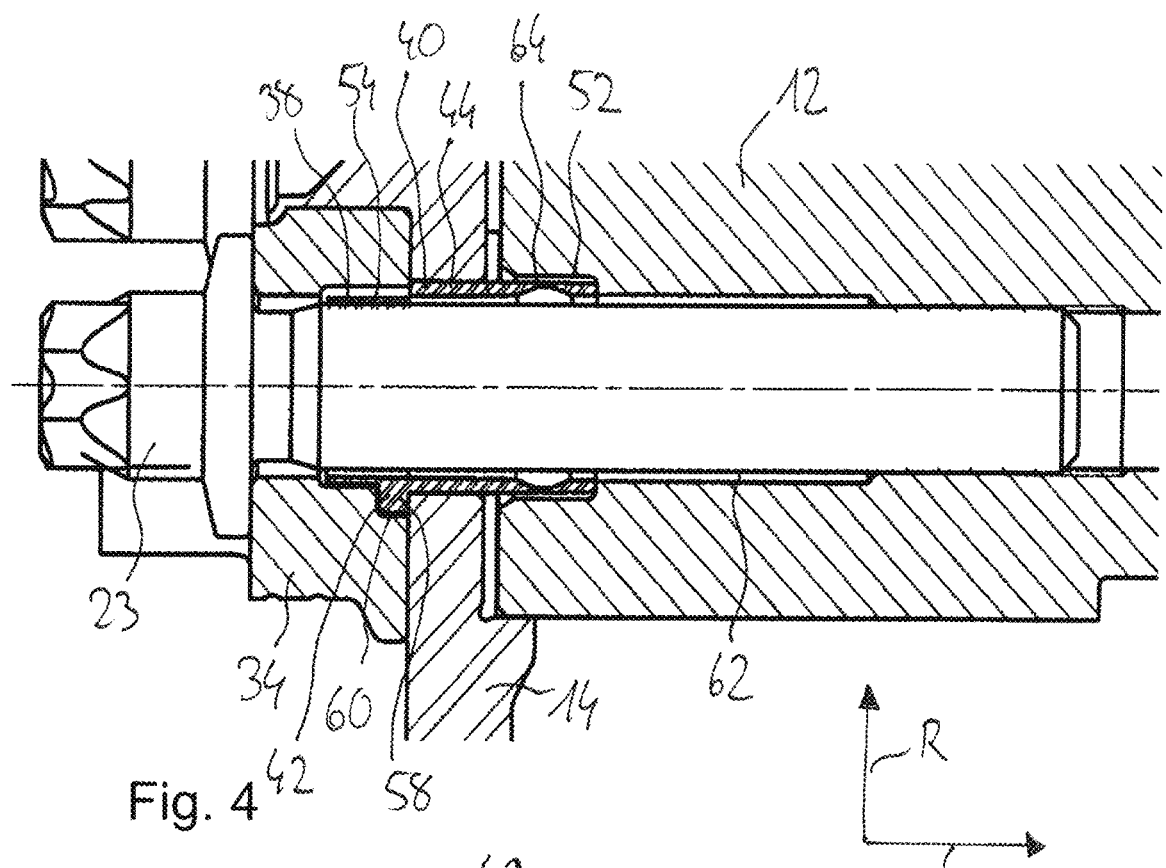
FIG. 4 an enlarged cross-section of a securing and centring means in accordance with the second embodiment in a pre-assembled state of a vibration damping device on a crankshaft.
Figure 5:
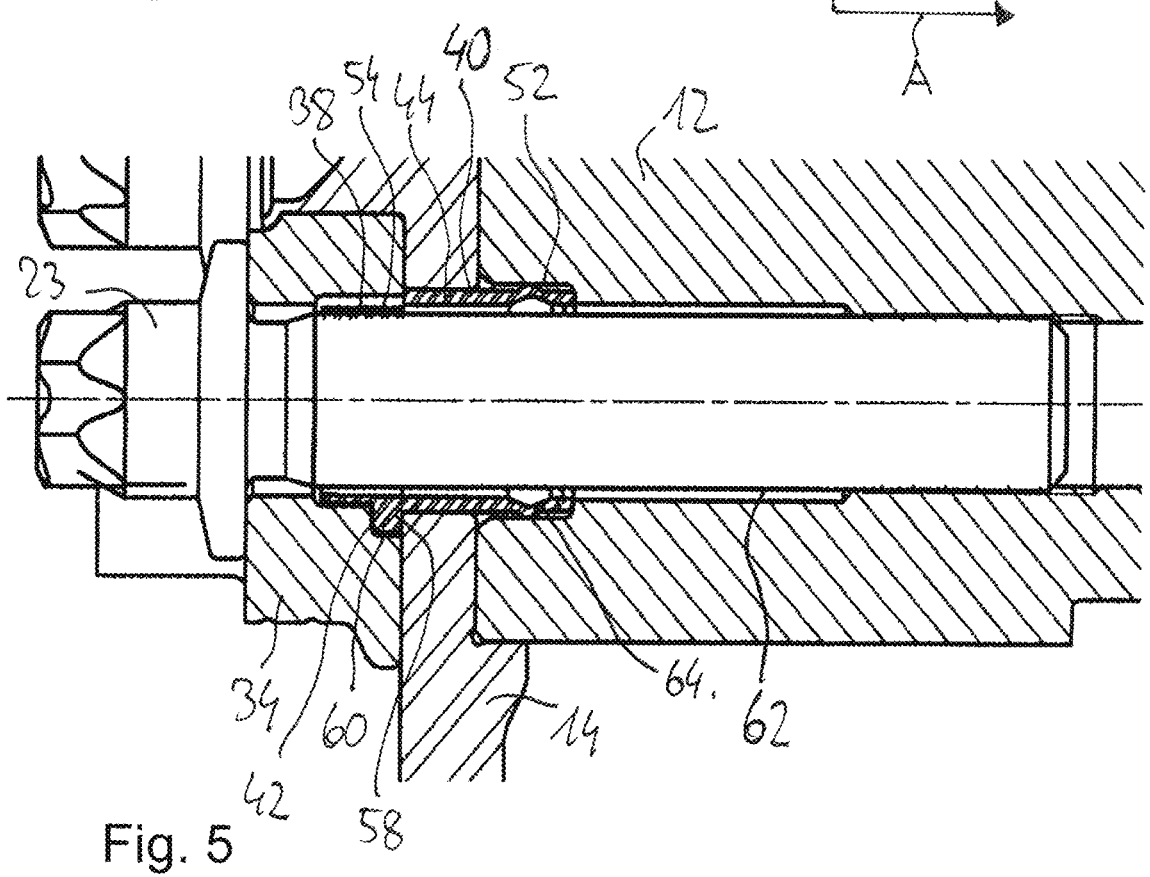
FIG. 5 an enlarged cross-section of the securing and centring means of FIG. 4 when the vibration damping device is bolted to the crankshaft.

FIG. 1 shows a vibration damping device 10 used to transmit a rotary motion of a crankshaft 12 shown in FIGS. 4 and 5 to an auxiliary unit (not shown) via a belt drive (not shown). Furthermore, the vibration damping device 10 dampens and/or insulates the vibrations of the crankshaft 12.

The vibration damping device 10 shown in FIG. 1 has a hub 14, a pulley 16 and a first elastomer body 18 connecting the hub 14 and the pulley 16 with each other. The pulley 16 has a V-profile 20 to accommodate a belt or belt drive (not shown). Through the hub 14, the vibration damping device 10 is attached to the crankshaft 12 by means of fastening elements 22. In the present case, the fastening elements 22 are designed as screws 23, which are inserted in openings 24 of hub 14.

The vibration damping device 10 further includes a torsional vibration damper 26, which has a flywheel mass 28, a torsional vibration damper hub 30 and a second elastomer body 32 connecting the flywheel mass 28 and the torsional vibration damper hub 30 to each other. The torsional vibration damper 26 is connected to the pulley 16 via the screws 23. For this purpose, the torsional vibration damper hub 30 is provided with openings 24 which are aligned with the openings 24 of the hub 14 so that the screws 23 extend into the openings 24 of the torsional vibration damper hub 30.

As can also be seen in FIG. 1, the vibration damping device 10 has a thrust piece 34 which abuts against the hub 14 on the front side and is also provided with openings 24 into which the screws 23 are inserted. Thus, the screws 23 connect the thrust piece 34, the hub 14 and the torsional vibration damper hub 30 with each other.

The screws 23 inserted in the openings 24 are secured against falling out of the openings 24 by means of a securing and centring means 36.

Figure 2:
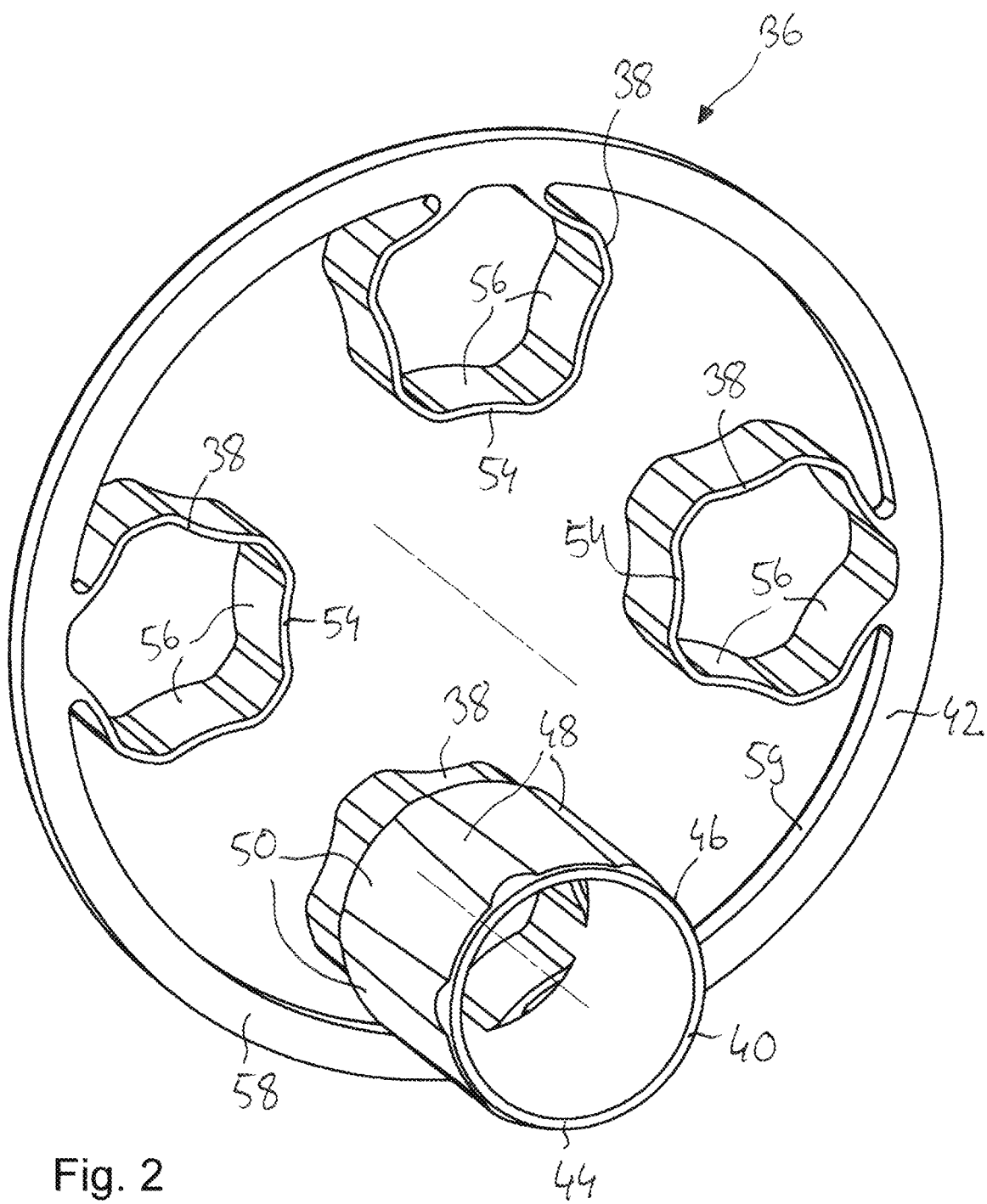
FIG. 2 an enlarged perspective view of the securing and centring means shown in FIG. 1.

The securing and centring means 36 shown in an enlarged view in FIG. 2 has securing mechanisms 38, a centring mechanism 40 and a connecting member 42 that connects the securing mechanisms 38 and the centring mechanism 40 with each other. The one-piece securing and centring device 36 is made of plastic, in particular polybutylene terephthalate (PBT), in an injection moulding process.

The centring mechanism 40 is designed as a centring bushing 44. The centring bushing 44 has projections 48 on its outer peripheral side 46 which form a cylindrical surface so that the projections 48 abut against the inner circumferential sides of the openings 24. Between the protrusions 48, there are draft angles 50 which, seen in axial direction A, are inclined. The draft angles 50 allow the centring bushing 44 to be demoulded from a single mould, for example an injection mould.

As can be seen when viewing FIGS. 1, 4 and 5 together, a section 51 of the centring bushing 44 extends beyond the opening 24. Section 51 extending out of opening 24 is inserted into an assembly opening 52 of the crankshaft 12 during assembly of the vibration damping device 10. This allows the centring bushing 44 to centre and position the vibration damper 10 on the crankshaft 12.

As can be seen in FIG. 2, the centring mechanism 40 also has a securing mechanism 38 which secures the screw 23 inserted into the centring sleeve 44 against falling out, as will be explained in more detail below.

The securing mechanisms 38 are designed as sleeves 54 which are wave-shaped when viewed in cross-section. The sleeves 54 have radially inward projecting protrusions 56, which are attached to the fastening element 22, which are screws 23 in the present case, in a keyed and/or friction-locked manner in order to secure the fastening element 22 against falling out of the openings 24. For this purpose, the protrusions 56 are designed in an elastically deformable manner, so that the protrusions 56 may deform and abut to the screw 23 in a keyed and/or friction-locked manner when inserting the screw. The protrusions 56 thus exert pressure on the screws 23 and secure them against falling out. In particular, the protrusions 56 are pressed radially outwards when a screw 23 is inserted.

As can also be seen in FIG. 2, the connecting member 42 is designed as an outer ring 58. The connecting member 42 surrounds or encompasses the securing mechanisms 38 and the centring mechanism 40, the securing mechanisms 38 and the centring mechanism 40 being connected with an inner circumferential surface 59 of the outer ring 58. The securing mechanisms 38 and the centring mechanism 40 are arranged at equidistant intervals from each other on the inner circumferential surface 59. The connecting member 42 may also be designed as a polygon-shaped ring. As can be seen in FIG. 1, the outer ring is 58 is inserted into a locating groove 60 introduced into the thrust piece 34.

In the following, a possible procedure for the assembly of the vibration damper 10 on the crankshaft 12 using the securing and centring means 36 is described. First, the securing and centring means 36 is inserted into the thrust piece 34. For this purpose, the connecting member 42 is inserted into the receiving groove 60, and the securing mechanisms 38 are inserted into the openings 24 of the thrust piece 34. Subsequently, the hub 14 and the torsional vibration damper hub 30 are positioned relative to each other in such a way that their openings 24 are aligned with each other. Then the thrust piece 34 is mounted on the hub 14, the centring bushing 44 thereby being inserted into the openings 24 of the hub 14 and of the torsional vibration damper hub 30. Subsequently, the screws 23 are inserted into the openings 24 of the thrust piece 34, the hub 14 and the torsional vibration damper hub 30, the safety devices 38 thereby preventing the screws 23 from falling out of the openings 24. This status corresponds to a delivery status. For assembling the vibration damping device 10 on the crankshaft 12, the vibration damping device 10 is first positioned on the crankshaft 12 by inserting the section 51 of the centring bushing 44 protruding from the opening 24 into the assembly opening 52 of the crankshaft 12. Finally, the screws 23 are screwed into the threaded holes 62 of the crankshaft 12.

In the following, a further embodiment of the securing and centring means 36 is described using the same reference signs for identical and functionally identical parts.

Figure 3:
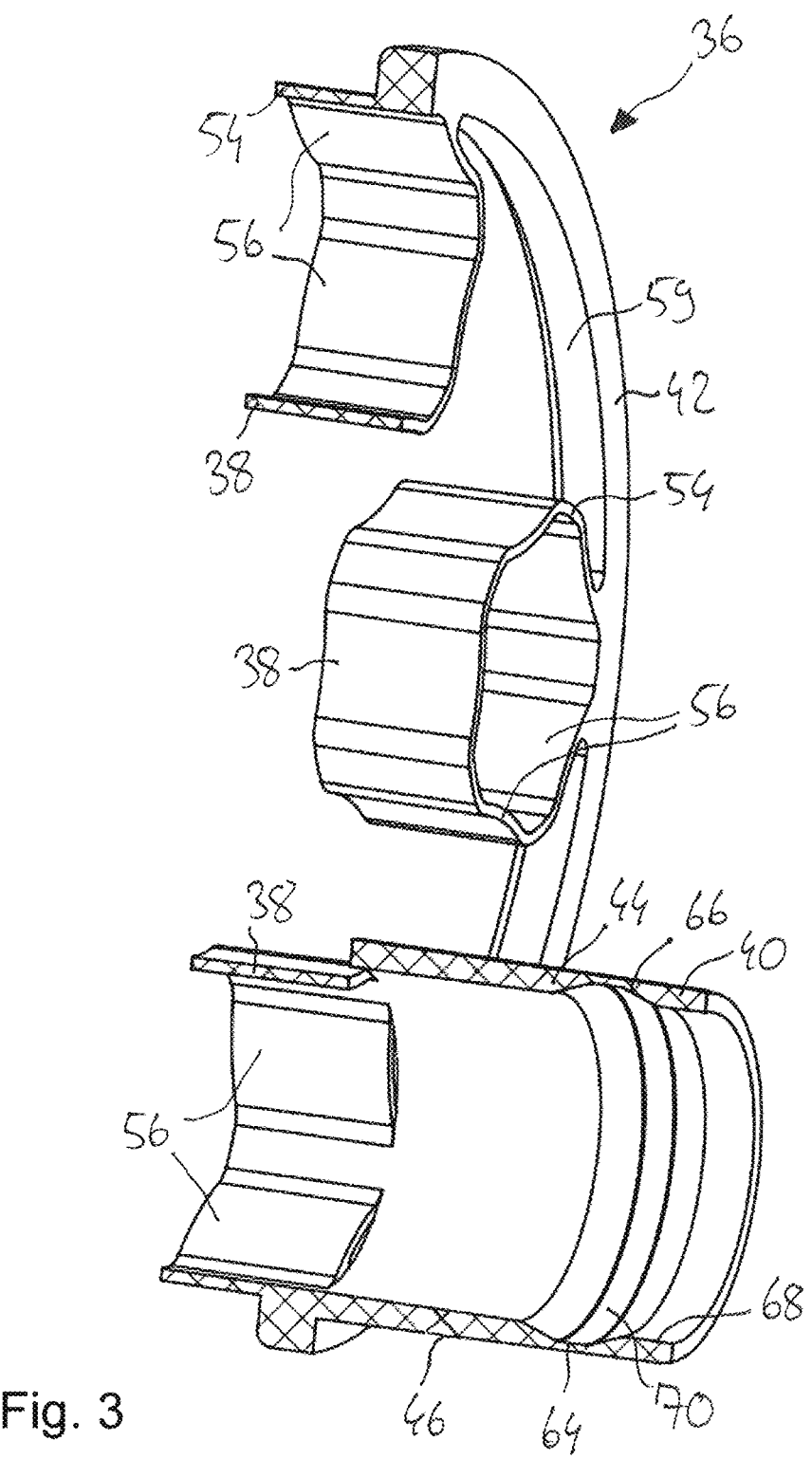
FIG. 3 an enlarged perspective view of a cross-section of a securing and centring means in accordance with a second embodiment.

FIG. 3 shows a second embodiment of the securing and centring means 36 which differs from the first embodiment by the fact that the vibration damping device 10 has no torsional vibration damper and that the centring mechanism 40 is provided with a predetermined bending point 64. The predetermined bending point 64 can be deformed by applying a force onto the centring mechanism 40 acting in axial direction A. The predetermined bending point 64 is designed as a tapered wall section 66 in the centring mechanism 40. In particular, the nominal bending point 64 is designed as a circumferential recess 70 introduced into the inner surface 68 of the centring bushing 44, the cross-section of which is trapezoidal in the present case. By applying a force in axial direction A onto the centring mechanism 40, the predetermined bending point 64 is deformed radially outwards, as explained in more detail below.

In FIG. 4, the vibration damping device 10 is shown in its pre-assembled state. In this state, the vibration damping device 10 is spaced from the crankshaft 12, and the centring bushing 44 contacts the front of the assembly opening 52. In radial direction R, the nominal bending point 64 is spaced from the assembly opening 52. This results in a play in radial direction R.

In FIG. 5, the bolted status is shown. By tightening the screws 23, a force acting in axial direction A is exerted on the centring bushing 44. As a result, the centring bushing 44 is compressed and the predetermined bending point 64 bulges radially outwards. The bulged predetermined bending point 64 abuts against the inside of the assembly opening 52 and thus causes a radial positioning of the vibration damping device 10 on the crankshaft 12 free of play.

Figure 6:
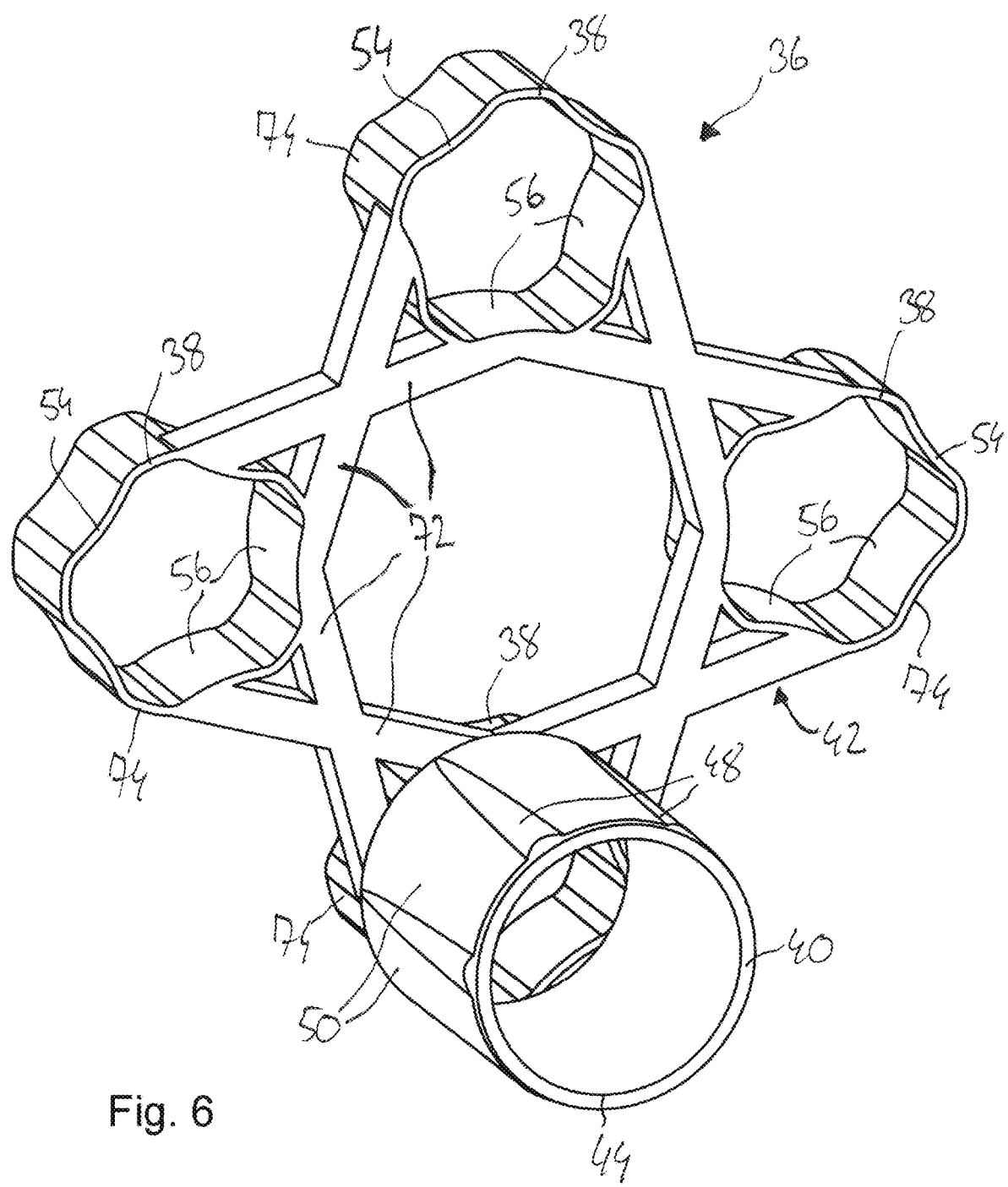
FIG. 6 an enlarged perspective view of a cross-section of a securing and centring means in accordance with a third embodiment.

In FIG. 6, a third embodiment of the securing and centring means 36 is shown, which differs from the other embodiments by the fact that the connecting member is designed as struts 72.

The struts 70 are substance-bonded to an outer side 74 of the safety mechanisms 38 and the centring mechanism 40, in particular to an outside 74 of the safety mechanism 38 of the centring mechanism 40.

Figure 7:
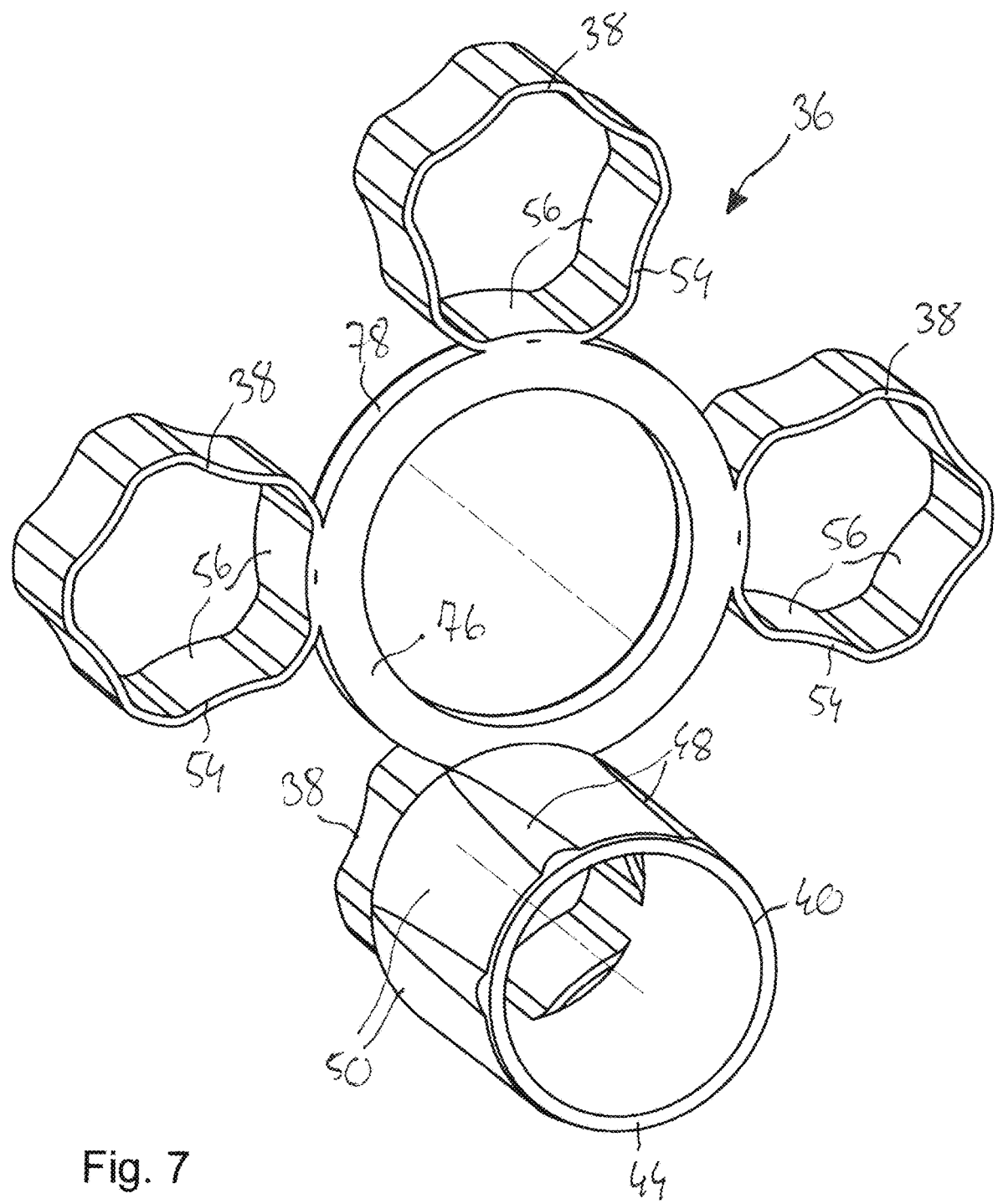
FIG. 7 an enlarged perspective view of a cross-section of a securing and centring means in accordance with a fourth embodiment.

In FIG. 7 a fourth embodiment of the securing and centring means 36 is shown, which differs from the other embodiments by the fact that the connecting member 42 is designed as an inner ring 76.

The securing mechanisms 38 and the centring mechanism 40 are connected to an outer peripheral surface 78 of the inner ring 76 so that the securing mechanisms 38 and the centring mechanism 40 surround the inner ring 76 at equidistant intervals.

The securing and centring means 36 is characterised by the connection of at least one securing mechanism 38 and at least one centring mechanism 40 by means of the connecting member 42. This allows securing the screws 23 against falling out during delivery and assembly and, at the same time, positioning and centring the vibration damping device 10 and the crankshaft 12 in relation to each other. This simplifies the assembly process, and the assembly costs are reduced. In addition, by connecting the individual elements, namely the securing mechanism 38 and the centring mechanism 40, by means of the connecting element 42, an exact position of the elements in relation to each other is determined so that they cannot be caught in the screw assembly. Furthermore, this prevents individual elements, such as a securing mechanism 38 or a centring mechanism 40, from being forgotten. Thus, process reliability of the assembly process is significantly improved. Moreover, the centring mechanism 40 is designed in such a way that a centring in different planes and a centring on the crankshaft 12 are made possible.

The invention claimed is:

1. A securing and centring device for securing fastening elements of a vibration damping device and for centring the vibration damping device on a component, the securing and centring device comprising:
   a securing mechanism configured to be inserted into an opening of said vibration damping device and configured to secure one of the fastening elements inserted into the opening against falling out,
   a centring mechanism configured to be inserted into a further opening of said vibration damping device and into an assembly opening of said component for positioning and/or centring said vibration damping device and said component relative to each other, and
   a connecting member connected to the securing mechanism;
   wherein the centring mechanism is configured as a centring bushing, and the securing mechanism is configured as a sleeve having radially projecting protrusions which abut against said one of the fastening elements in a keyed and/or friction-locked manner.

2. The securing and centring device according to claim 1, wherein the centring mechanism is connected to the securing mechanism.

3. The securing and centring device of claim 2, wherein the connecting member connects the centring mechanism to the securing mechanism.

4. The securing and centring device of claim 3, wherein the centring mechanism and the securing mechanism extending in opposing directions from the connecting member.

5. The securing and centring device according to claim 1, wherein the centring mechanism includes a predetermined bending point at an axial location which is deformable by applying an axial force onto the centring mechanism.

6. The securing and centring device according to claim 5, wherein the predetermined bending point is configured as a tapered wall section in the centring mechanism.

7. The securing and centring device according to claim 1, wherein the radially inwardly projecting protrusions are configured to deform when said one of the fastening elements is inserted.

8. The securing and centring device according to claim 1, wherein the connecting member is configured as an outer ring, as an inner ring, or as struts.

9. The securing and centring device according to claim 8, wherein the outer ring and/or the inner ring is configured as a circular ring or a polygonal ring.

10. The securing and centring device according to claim 1, wherein the securing and centring device is integrally formed as a single piece.

11. The securing and centring device according to claim 1, wherein the securing and centring device is made of metal and/or plastic.

12. The securing and centring device of claim 1, including at least one additional securing mechanism connected to the connecting member.

13. A vibration damping device for reducing vibrations on a crankshaft, the vibration damping device comprising:
   a fastening element for fastening the vibration damping device to said crankshaft; and
   a securing and centring device including:
      a securing mechanism configured to be inserted into an opening of said vibration damping device and configured to secure the fastening element inserted into the opening against falling out,
      a centring mechanism configured to be inserted into a further opening of said vibration damping device and into an assembly opening of said crankshaft for positioning and/or centring said vibration damping device and said crankshaft relative to each other, and
      a connecting member connected to the securing mechanism;
   wherein the centring mechanism is configured as a centring bushing;

wherein the centring mechanism includes a predetermined bending point at an axial location which is deformable by applying an axial force onto the centring mechanism; and wherein the predetermined bending point is configured as a tapered wall section in the centring mechanism.

14. The vibration damping device of claim 13, including at least one additional fastening element; wherein the securing and centring device includes at least one additional securing mechanism connected to the connecting member; the securing mechanism is connected to the fastening element; and each additional fastening element is connected with a respective additional securing mechanism.

15. A securing and centring device for securing fastening elements of a vibration damping device and for centring the vibration damping device on a component, the securing and centring device comprising:

a securing mechanism configured to be inserted into an opening of said vibration damping device and configured to secure one of the fastening elements inserted into the opening against falling out, a centring mechanism configured to be inserted into a further opening of said vibration damping device and into an assembly opening of said component for positioning and/or centring said vibration damping device and said component relative to each other, and a connecting member connected to the securing mechanism;

wherein the centring mechanism is configured as a centring bushing; the centring mechanism is connected to the securing mechanism; the connecting member connects the centring mechanism to the securing mechanism; and the centring mechanism and the securing mechanism extend in opposing directions from the connecting member.

* * * * *